UNITED STATES PATENT OFFICE.

MAX ENGELMANN, OF ELBERFELD, GERMANY, ASSIGNOR TO FARBEN-FABRIKEN OF ELBERFELD CO., OF NEW YORK, N. Y., A CORPORATION OF NEW YORK.

PROCESS OF MAKING DIALKYL-BARBITURIC ACIDS.

No. 809,362.  Specification of Letters Patent.  Patented Jan. 9, 1906.

Application filed October 16, 1905. Serial No. 283,017.

*To all whom it may concern:*

Be it known that I, MAX ENGELMANN, doctor of philosophy, chemist, residing at Elberfeld, Nützenbergerstrasse 24, Germany, (assignor to the FARBENFABRIKEN OF ELBERFELD CO., of New York,) have invented a new and useful Improvement in Processes of Making Dialkyl-Barbituric Acids; and I do hereby declare the following to be an exact and clear description of my invention.

My invention relates to a new and valuable process for the production of dialkyl-barbituric acids (2-4-6-trioxy-5-dialkylpyrimidins) having the following general formula:

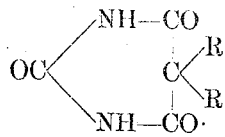

(R meaning an alkyl radical,) which bodies possess valuable therapeutic, especially soporific, properties.

The process consists in heating with acids the 2-thio-4-imino-5-dialkyl-6-oxypyrimidins having the following general formula:

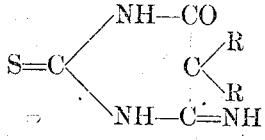

By this process the sulfur and the imino group are eliminated and replaced by oxygen, dialkyl-barbituric acids being formed.

The 2-thio-4-imino-5-dialkyl-6-oxypyrimidins are obtained, as is known, by condensing thio-urea with dialkylated cyano acetic esters by means of alkaline alcoholates.

Example I: Twenty (20) parts, by weight, of 2-thio-4-imino-5-diethyl-6-oxypyrimidin are heated in an autoclave for five (5) hours to one hundred and fifty degrees (150°) centigrade with eighty (80) parts, by weight, of fuming hydrochloric acid. After cooling the diethyl-barbituric acid (2-4-6-trioxy-5-diethylpyrimidin) which has separated is filtered off and purified by recrystallization from water.

Example II: Five (5) parts, by weight, of 2-thio-4-imino-5-dipropyl-6-oxypyrimidin are heated at a reflux-condenser for twenty (20) hours with one hundred (100) parts, by weight, of a sulfuric-acid solution containing forty per cent. of sulfuric acid. After cooling the dipropylbarbituric acid which has separated in crystals is purified by recrystallization.

The process can also be carried out with other of the above-mentioned pyrimidin derivatives, such as 2-thio-4-imino-5-dimethyl-6-oxypyrimidin, &c., or with other acids.

Having now described my invention and in what manner the same is to be performed, what I claim as new, and desire to secure by Letters Patent, is—

1. The process for the production of dialkyl-barbituric acids having the above-given general formula, which process consists in heating 2-thio-4-imino-5-dialkyl-6-oxypyrimidins with acids, substantially as hereinbefore described.

2. The process for the production of diethyl-barbituric acid, which process consists in heating 2-thio-4-imino-5-diethyl-6-oxypyrimidin with acids, substantially as hereinbefore described.

In testimony whereof I have signed my name in the presence of two subscribing witnesses.

MAX ENGELMANN.

Witnesses:
 OTTO KÖNIG,
 J. A. RITTERSHAUS.